(12) United States Patent
Anand et al.

(10) Patent No.: US 10,944,692 B2
(45) Date of Patent: Mar. 9, 2021

(54) REAL-TIME ANALYSIS OF MULTIDIMENSIONAL TIME SERIES DATA TO IDENTIFY AN OPERATIONAL ANOMALY

(71) Applicant: Capital One Services, LLC, McLean, VA (US)

(72) Inventors: Kumar Anand, Plano, TX (US); Aaron Hoenig, Plano, TX (US); Amit Pandey, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/245,966

(22) Filed: Jan. 11, 2019

(65) Prior Publication Data

US 2019/0260688 A1 Aug. 22, 2019

Related U.S. Application Data

(63) Continuation of application No. 15/902,765, filed on Feb. 22, 2018, now Pat. No. 10,187,326.

(51) Int. Cl.
| | |
|---|---|
| *H04L 12/26* | (2006.01) |
| *H04L 12/911* | (2013.01) |
| *G06F 17/18* | (2006.01) |
| *G06F 11/34* | (2006.01) |
| *G06F 5/01* | (2006.01) |
| *H04L 12/927* | (2013.01) |

(52) U.S. Cl.
CPC ............ *H04L 47/822* (2013.01); *G06F 5/01* (2013.01); *G06F 11/3452* (2013.01); *G06F 17/18* (2013.01); *H04L 43/08* (2013.01); *H04L 43/16* (2013.01); *H04L 47/803* (2013.01)

(58) Field of Classification Search
CPC combination set(s) only.
See application file for complete search history.

(56) References Cited

U.S. PATENT DOCUMENTS

| | | | |
|---|---|---|---|
| 8,949,677 B1 * | 2/2015 | Brundage | G06F 11/0745 714/48 |
| 10,187,326 B1 | 1/2019 | Anand et al. | |
| 2005/0193281 A1 | 9/2005 | Ide | |
| 2006/0101402 A1 | 5/2006 | Miller et al. | |
| 2006/0241901 A1 | 10/2006 | Hanus | |
| 2007/0028219 A1 | 2/2007 | Miller et al. | |

(Continued)

*Primary Examiner* — Viet D Vu
(74) *Attorney, Agent, or Firm* — Harrity & Harrity, LLP (57) ABSTRACT

A device may receive data for a plurality of metrics from a set of server resources associated with hosting an application. The plurality of metrics may be related to a performance of the set of server resources. The data may be time series data. The device may normalize the data for the plurality of metrics across a set of points in time to form normalized data. The device may determine a score for the performance of the set of server resources associated with hosting the application at a particular point in time based on the normalized data. The score may be used to determine whether an anomaly is present in the performance of the set of server resources at the particular point in time. The device may perform an action to facilitate improvement of the performance of the set of server resources based on the score satisfying a threshold.

20 Claims, 5 Drawing Sheets

(56) References Cited

U.S. PATENT DOCUMENTS

| | | | |
|---|---|---|---|
| 2008/0208526 A1* | 8/2008 | Thibaux | G06K 9/00536 |
| | | | 702/176 |
| 2009/0271664 A1 | 10/2009 | Haas et al. | |
| 2011/0078106 A1 | 3/2011 | Luchi et al. | |
| 2012/0278477 A1 | 11/2012 | Terrell et al. | |
| 2013/0282331 A1 | 10/2013 | Cohen | |
| 2013/0298243 A1 | 11/2013 | Kumar et al. | |
| 2015/0205691 A1* | 7/2015 | Seto | G06F 11/008 |
| | | | 702/182 |
| 2015/0229662 A1* | 8/2015 | Hitt | H04L 63/1433 |
| | | | 726/23 |
| 2016/0117389 A1 | 4/2016 | Saini | |
| 2017/0161963 A1 | 6/2017 | Green | |
| 2018/0027004 A1* | 1/2018 | Huang | H04L 63/1425 |
| | | | 726/23 |
| 2018/0039555 A1 | 2/2018 | Salunke | |
| 2018/0196637 A1 | 7/2018 | Dayan | |
| 2019/0147300 A1* | 5/2019 | Bathen | G06K 9/6284 |
| | | | 706/12 |

\* cited by examiner

REAL-TIME ANALYSIS OF MULTIDIMENSIONAL TIME SERIES DATA TO IDENTIFY AN OPERATIONAL ANOMALY

RELATED APPLICATION

This application is a continuation of U.S. patent application Ser. No. 15/902,765, filed Feb. 22, 2018 (now U.S. Pat. No. 10,187,326), which is incorporated herein by reference.

BACKGROUND

Anomaly detection, which may also be referred to as outlier detection, is the identification of items, events, or observations that do not conform to an expected pattern or to other items in a dataset. Items that are identified as anomalous in an environment may indicate the occurrence of one or more problems in that environment.

SUMMARY

According to some possible implementations, a device may comprise one or more memories; and one or more processors, communicatively coupled to the one or more memories, to receive data for a plurality of metrics from a set of server resources associated with hosting an application. The plurality of metrics may be related to a performance of the set of server resources. The data may be time series data. The one or more processors may normalize the data for the plurality of metrics across a set of points in time to form normalized data. The normalized data may identify a normal distribution for the performance of the set of server resources across the set of points in time. The one or more processors may determine a score for the performance of the set of server resources associated with hosting the application at a particular point in time based on the normalized data. The score may be used to determine whether an anomaly is present in the performance of the set of server resources at the particular point in time. The one or more processors may perform an action to facilitate improvement of the performance of the set of server resources based on the score satisfying a threshold. Satisfaction of the threshold may indicate that the anomaly is present.

According to some possible implementations, a non-transitory computer-readable medium may store one or more instructions that, when executed by one or more processors, may cause the one or more processors to receive data for a plurality of metrics from a set of server resources associated with hosting an application. The data may be related to a performance of the set of server resources over time. The plurality of metrics may include a plurality of different types of metrics. The one or more instructions, when executed by the one or more processors, may cause the one or more processors to normalize the data for the plurality of metrics across a set of points in time to form normalized data. The normalized data may identify a distribution for the performance of the set of server resources across the set of points in time. The one or more instructions, when executed by the one or more processors, may cause the one or more processors to determine a score for the performance of the set of server resources associated with hosting the application at a particular point in time based on the normalized data. The score may indicate the performance of the set of server resources at the particular point in time relative to the performance of the set of server resources across the set of points in time. The one or more instructions, when executed by the one or more processors, may cause the one or more processors to determine that the score for the performance of the set of server resources satisfies a threshold after determining the score for the performance. The one or more instructions, when executed by the one or more processors, may cause the one or more processors to perform an action to facilitate improvement of the performance of the set of server resources based on determining that the score satisfies the threshold.

According to some possible implementations, a method may include receiving, by a device, time series data for a plurality of metrics from a set of server resources associated with hosting an application. The plurality of metrics may be related to a performance of the set of server resources. The time series data may be received as the application performs a set of operations. The method may include normalizing, by the device, the time series data for the plurality of metrics across a set of points in time to form normalized data. The normalized data may identify a normal distribution for the performance of the set of server resources across the set of points in time. The method may include determining, by the device, a score for the performance of the set of server resources associated with hosting the application at a particular point in time based on the normalized data. The method may include determining, by the device, that an anomaly is present in the performance of the set of server resources at the particular point in time based on the score relative to the normal distribution for the performance of the set of server resources. The method may include performing, by the device, an action to facilitate improvement of the performance of the set of server resources based on determining that the anomaly is present in the performance of the set of server resources at the particular point in time.

DETAILED DESCRIPTION

The following detailed description of example implementations refers to the accompanying drawings. The same reference numbers in different drawings may identify the same or similar elements.

Operational performance of a server resource may be monitored to identify anomalous behavior. For example, particular metrics may be monitored to determine whether values for the metrics satisfy corresponding thresholds. These thresholds, however, are often static in nature and do not account for changes in the operational performance of the server resource over time or at different times. In addition, metrics may be monitored in isolation, thereby inhibiting identification of operational anomalies when values for individual metrics do not indicate an operational anomaly, but rather a combination of values for the metrics indicates an operational anomaly.

Some implementations, described herein, provide a performance analysis platform that is capable of analyzing multidimensional time series data related to a performance of a server resource. In this way, the performance analysis platform may identify operational anomalies in a performance of the server resource in context of a historical performance of the server resource for a particular time of day, for particular operations, and/or the like. In addition, this facilitates identification of operational anomalies that are indicated by combinations of metrics rather than by any individual metric. This improves anomaly identification via contextual identification of anomalies. In addition, this improves anomaly identification via a more complete analysis of metrics related to operation of the server resource. Further, this conserves processing resources that would otherwise be consumed due to false identification of an operational anomaly by facilitating more accurate identification of operational anomalies.

Figure 1A:
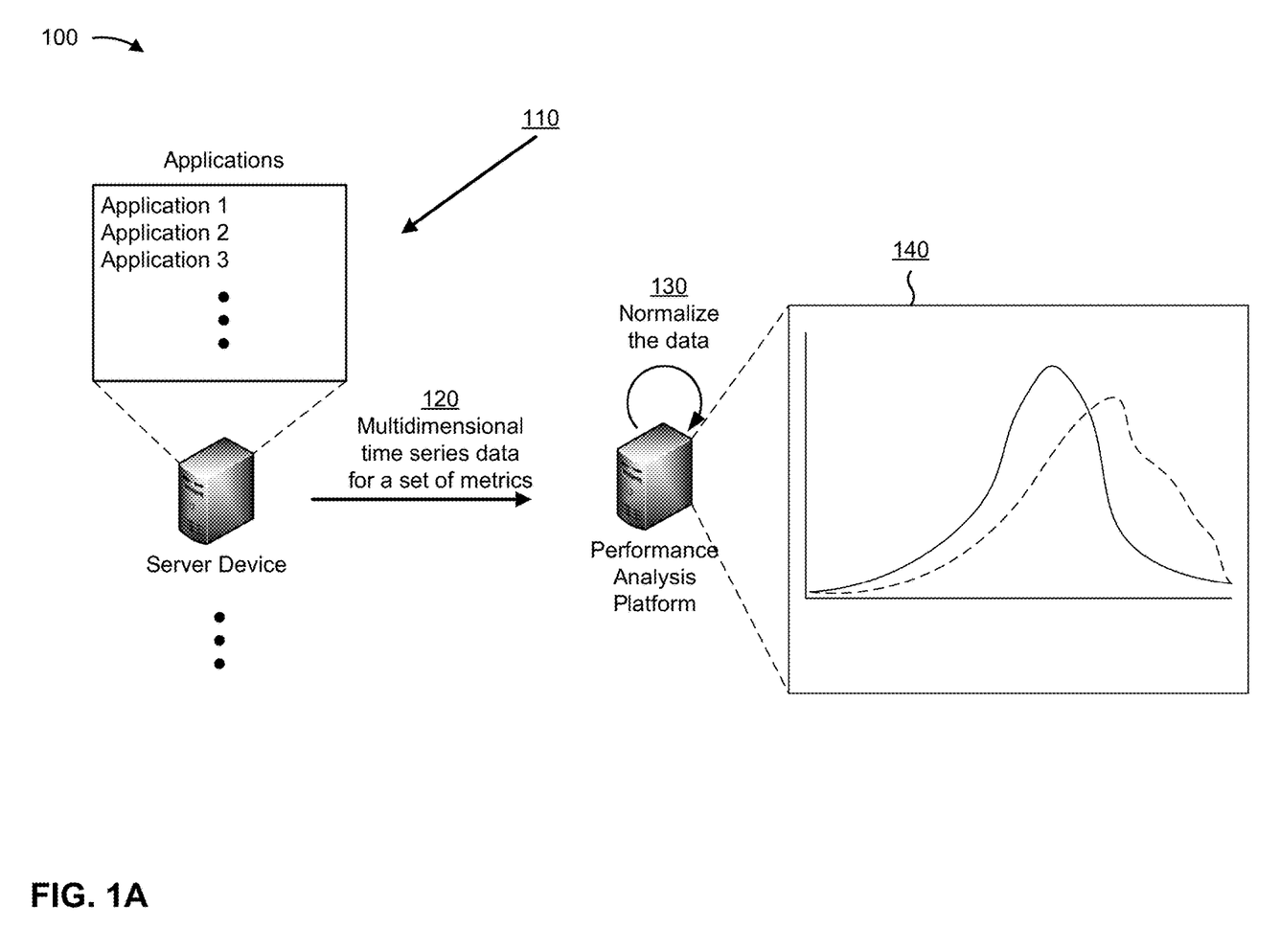
FIGS. 1A and 1B are diagrams of an overview of an example implementation described herein.
Figure 1B:
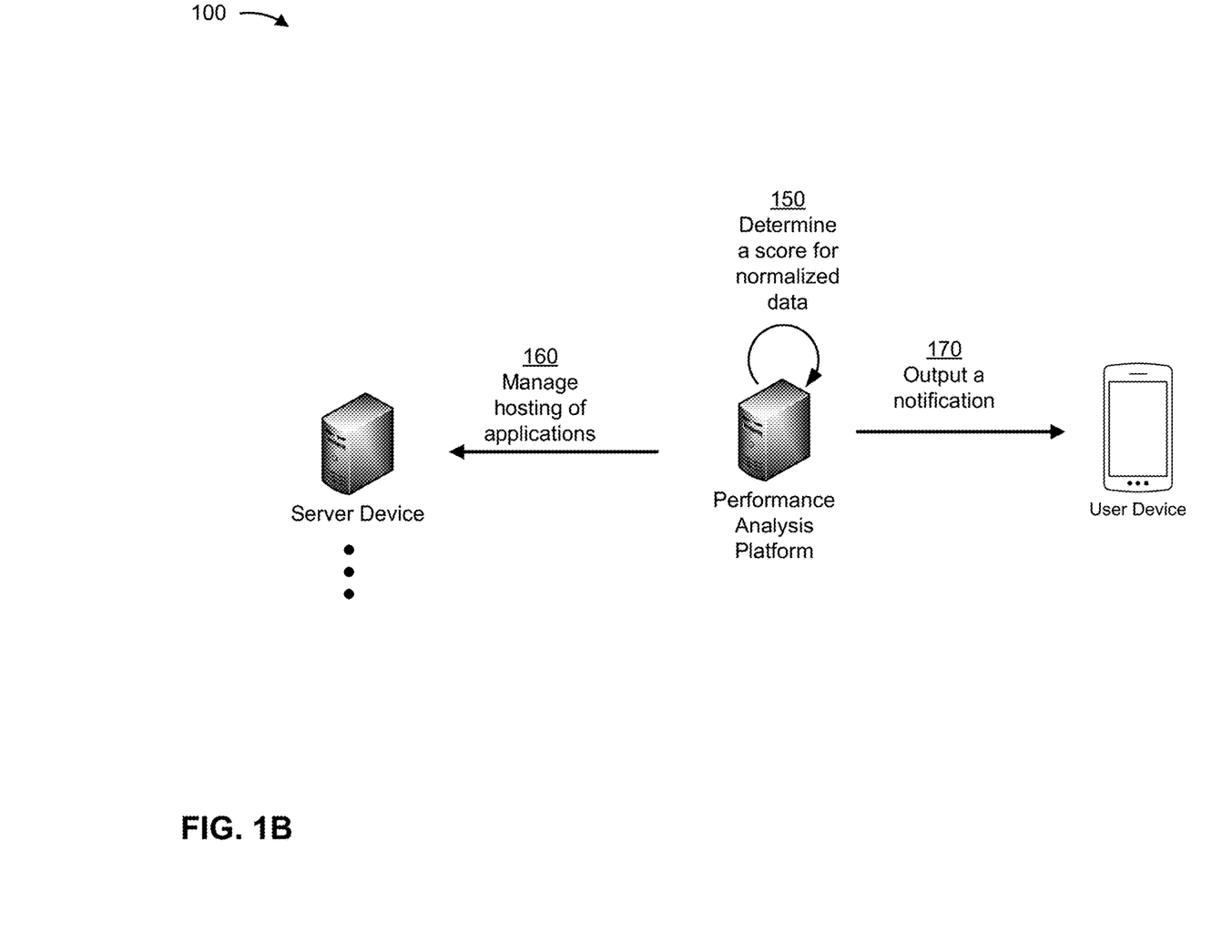

FIGS. 1A and 1B are diagrams of an overview of an example implementation 100 described herein. As shown in FIGS. 1A and 1B, example implementation 100 may include a set of server devices, a performance analysis platform, and a user device (not shown in FIG. 1A).

As shown in FIG. 1A, and by reference number 110, a server device may host various applications (or various instances of an application). The server device and the applications may operate in a way that a user of a user device could use the applications in a cloud computing environment. As shown by reference number 120, the performance analysis platform may receive multidimensional time series data for a set of metrics from various server resources related to hosting the applications, such as the server devices, applications hosted by the server devices, containers, hardware components, software modules, and/or the like.

In some implementations, the multidimensional time series data may include data that is multidimensional (e.g., data that includes various different metrics related to operational performance of the server resources). For example, the multidimensional time series data may include application-related metrics, run-time related metrics, container-related metrics, operating system-related metrics, hardware-related metrics, and/or network-related metrics. In some implementations, the multidimensional time series data may include data received over a period of time, data received for the same time period across different historical points in time (e.g., the same time across different days, the same day in different weeks, etc.), and/or the like.

As further shown in FIG. 1A, and by reference number 130, the performance analysis platform may normalize the multidimensional time series data. For example, the performance analysis platform may normalize the multidimensional time series data across a set of points in time (e.g., for a same day each week, for a same time each day, etc.). The performance analysis platform may normalize the multidimensional time series data using a normalization technique, such as a Box-Cox normalization technique to transform the data to fit a normal distribution. As shown by reference number 140, the performance analysis platform has transformed actual values for the set of metrics to fit a normal distribution. For example, the multidimensional time series data actually received is represented by the dotted line shown with respect to reference number 140, and the normalized multidimensional time series data is represented by the solid line shown with respect to reference number 140. By normalizing the multidimensional time series data, the performance analysis platform may form normalized data.

As shown in FIG. 1B, and by reference number 150, the performance analysis platform may determine a score for the normalized data. The performance analysis platform may use the normalized data to determine whether an anomaly is present in the multidimensional time series data. For example, the performance analysis platform may determine the score as an overall score based on individual scores for different subsets of the metrics (e.g., for different dimensions of the multidimensional time series data, such as operating system-related metrics, hardware-related metrics, network-related metrics, and/or the like). As a specific example, the performance analysis platform may apply a probability density function to the normalized data to generate a p value for each of the different subsets of the metrics. The performance analysis platform may then determine the overall score by applying a function (e.g., a sum, a product, an average, a weighted sum or average, and/or the like) to the p values for the different subsets of the metrics. The performance analysis platform may then determine whether the overall score satisfies a threshold, is within a range of values that indicates a normal operation, and/or the like.

As further shown in FIG. 1B, and by reference number 160, the performance analysis platform may perform an action based on the score, such as managing hosting of applications based on whether an anomaly is present, based on whether a previously identified anomaly is no longer present, and/or the like. For example, the performance analysis platform may cause applications to be hosted on different server devices, may bring server devices on line or take server devices offline, may add additional instances of applications, and/or the like. As shown by reference number 170, the performance analysis platform may output a notification to the user device, such as a notification that indicates that an anomaly has been detected (e.g., and identifying management actions that have been taken), that indicates that a previously identified anomaly is no longer present, and/or the like.

In this way, the performance analysis platform may dynamically and intelligently identify operational anomalies for a server resource based on contextual information related to a historical operation of the server resource. This improves an accuracy of identifying operational anomalies by reducing or eliminating false positive identifications that could result from reliance on static thresholds for metrics, a lack of contextual analysis related to operations of the server resource, and/or the like. In addition, this facilitates early identification of operational anomalies (e.g., via analysis of multidimensional time series data) in situations where use of isolated metrics and/or static thresholds would not indicate an operational anomaly, thereby improving detection of operational anomalies.

As indicated above, FIGS. 1A and 1B are provided merely as an example. Other examples are possible and may differ from what was described with regard to FIGS. 1A and 1B.

Figure 2:
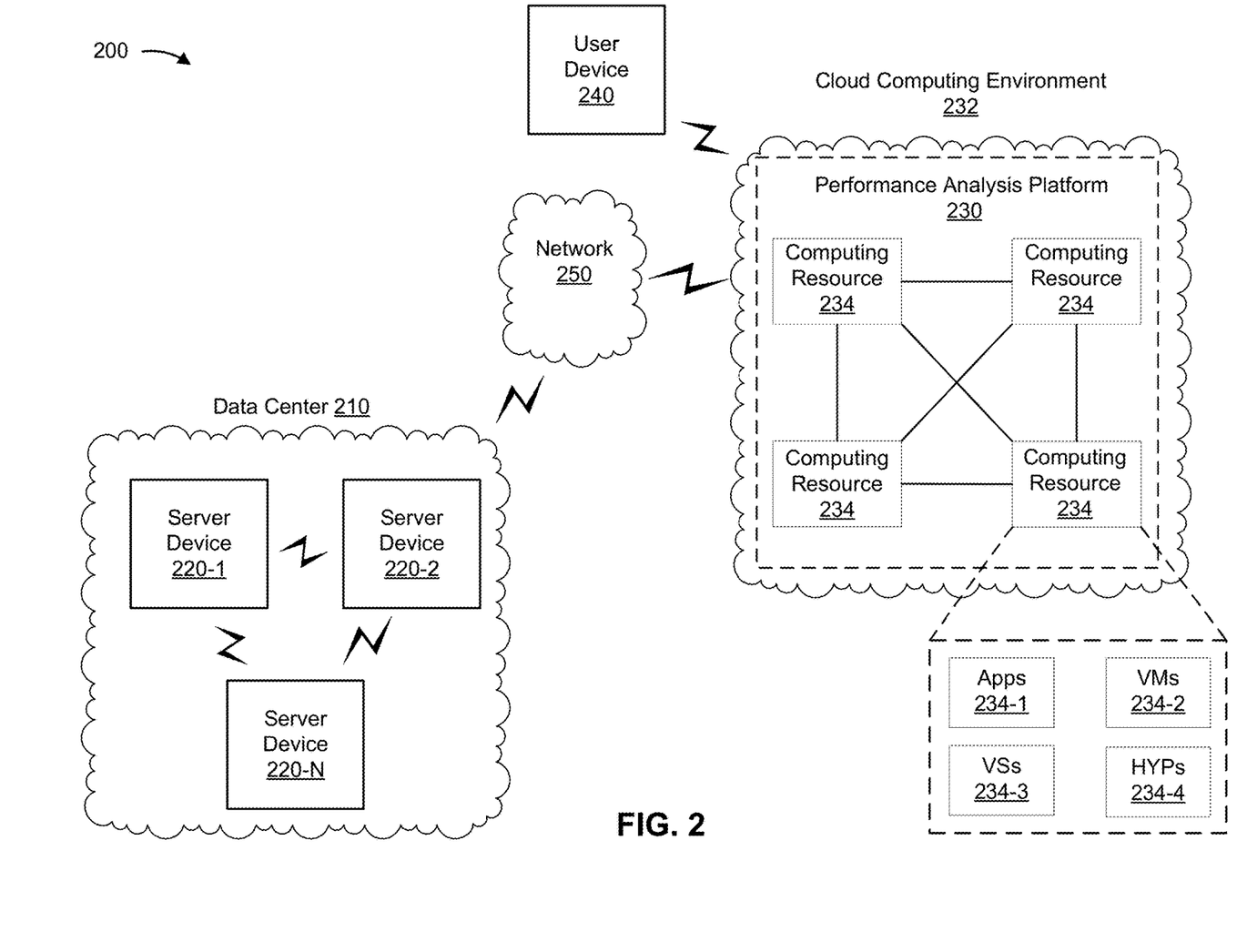
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a data center 210, a set of server devices 220-1 through 220-N (N≥1), a performance analysis platform 230 in a cloud computing environment 232 that includes a set of computing resources 234, a user device 240, and a network 250. Devices of environment 200 may interconnect via wired connections, wireless connections, or a combination of wired and wireless connections.

Data center 210 includes a logical or physical grouping of devices (e.g., a set of server devices 220). For example, data center 210 may include a facility that houses a set of server devices 220, a cloud-based grouping of a set of server devices 220 (e.g., where a physically distributed set of server devices 220 is grouped), and/or the like. In some implementations, data center 210 may provide, via a set of server devices 220, a hosting service for a set of applications.

Server device 220 includes one or more devices capable of receiving, generating, storing, processing, and/or providing information associated with operational performance of a set of server resources. For example, server device 220 may include a server (e.g., in a data center or a cloud computing environment), a data center (e.g., a multi-server micro data center), a workstation computer, a virtual machine (VM) provided in a cloud computing environment, or a similar type of device. In some implementations, server device 220 may provide a service, may host an application, and/or the like associated with data center 210, as described elsewhere herein. In some implementations, server device 220 may provide, to performance analysis platform 230, values for a set of metrics related to operational performance of a set of server resources operating on server device 220, as described elsewhere herein. In some implementations, server device 220 may be a physical device implemented within a housing, such as a chassis. In some implementations, server device 220 may be a virtual device implemented by one or more computer devices of a cloud computing environment or data center 210.

Performance analysis platform 230 includes one or more devices capable of receiving, generating, storing, processing, and/or providing information associated with operational performance of a server resource. For example, performance analysis platform 230 may include a cloud server or a group of cloud servers. In some implementations, performance analysis platform 230 may be designed to be modular such that certain software components can be swapped in or out depending on a particular need. As such, performance analysis platform 230 may be easily and/or quickly reconfigured for different uses.

In some implementations, as shown in FIG. 2, performance analysis platform 230 may be hosted in cloud computing environment 232. Notably, while implementations described herein describe performance analysis platform 230 as being hosted in cloud computing environment 232, in some implementations, performance analysis platform 230 may not be cloud-based (i.e., may be implemented outside of a cloud computing environment) or may be partially cloud-based.

Cloud computing environment 232 includes an environment that hosts performance analysis platform 230. Cloud computing environment 232 may provide computation, software, data access, storage, and/or other services that do not require end-user knowledge of a physical location and configuration of a system and/or a device that hosts performance analysis platform 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host performance analysis platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with performance analysis platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 240), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

User device 240 includes one or more devices capable of receiving, generating, storing, processing, and/or providing information associated with operational performance of a server resource. For example, user device 240 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 240 may receive output from performance analysis platform 230 that indicates whether an operational anomaly is present and/or an action that performance analysis platform 230 performed with regard to the operational performance of a server resource.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
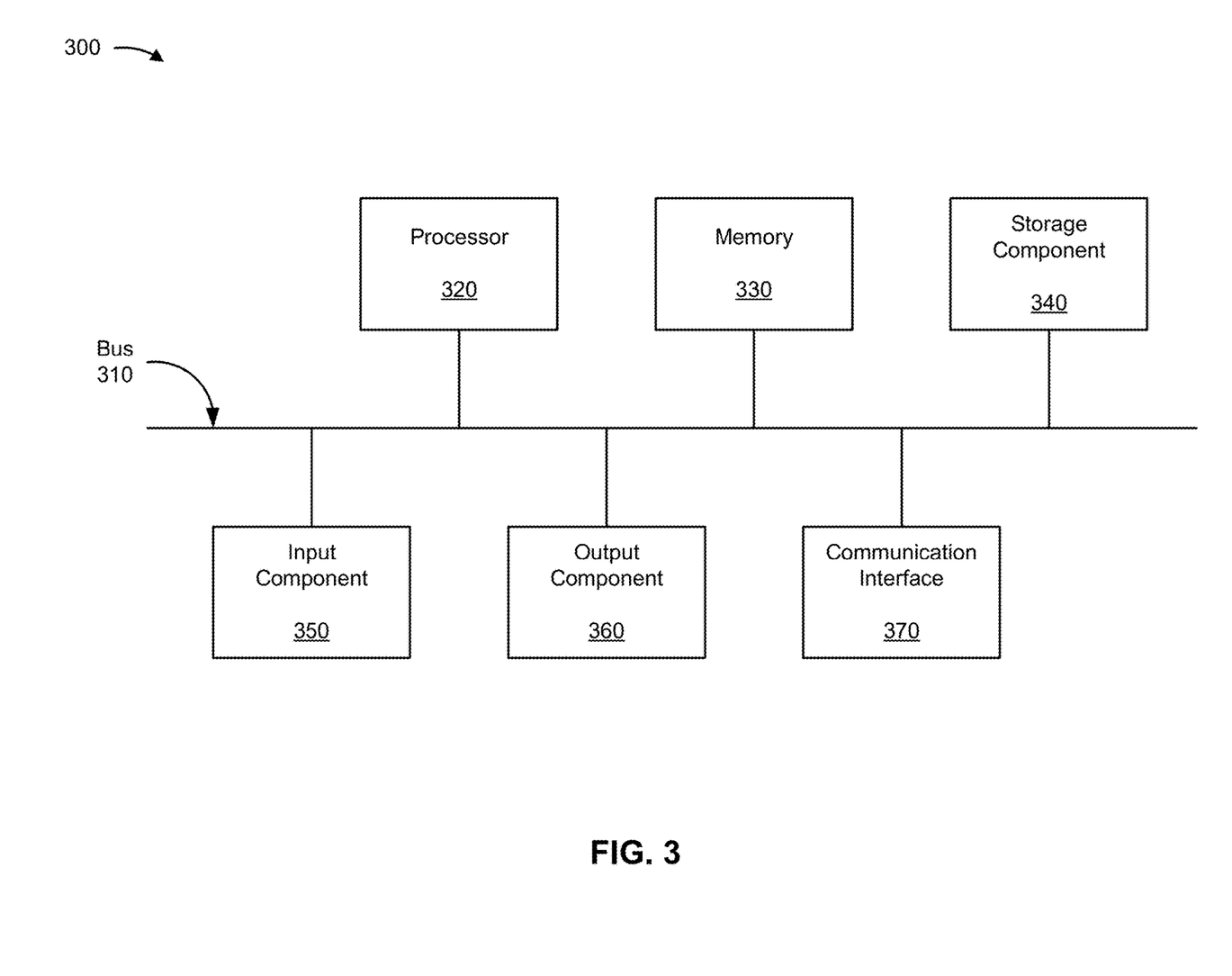
FIG. 3 is a diagram of example components of one or more devices of FIG. 2.

FIG. 3 is a diagram of example components of a device 300. Device 300 may correspond to data center 210, server device 220, performance analysis platform 230, computing resource 234, and/or user device 240. In some implementations, data center 210, server device 220, performance analysis platform 230, computing resource 234, and/or user device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
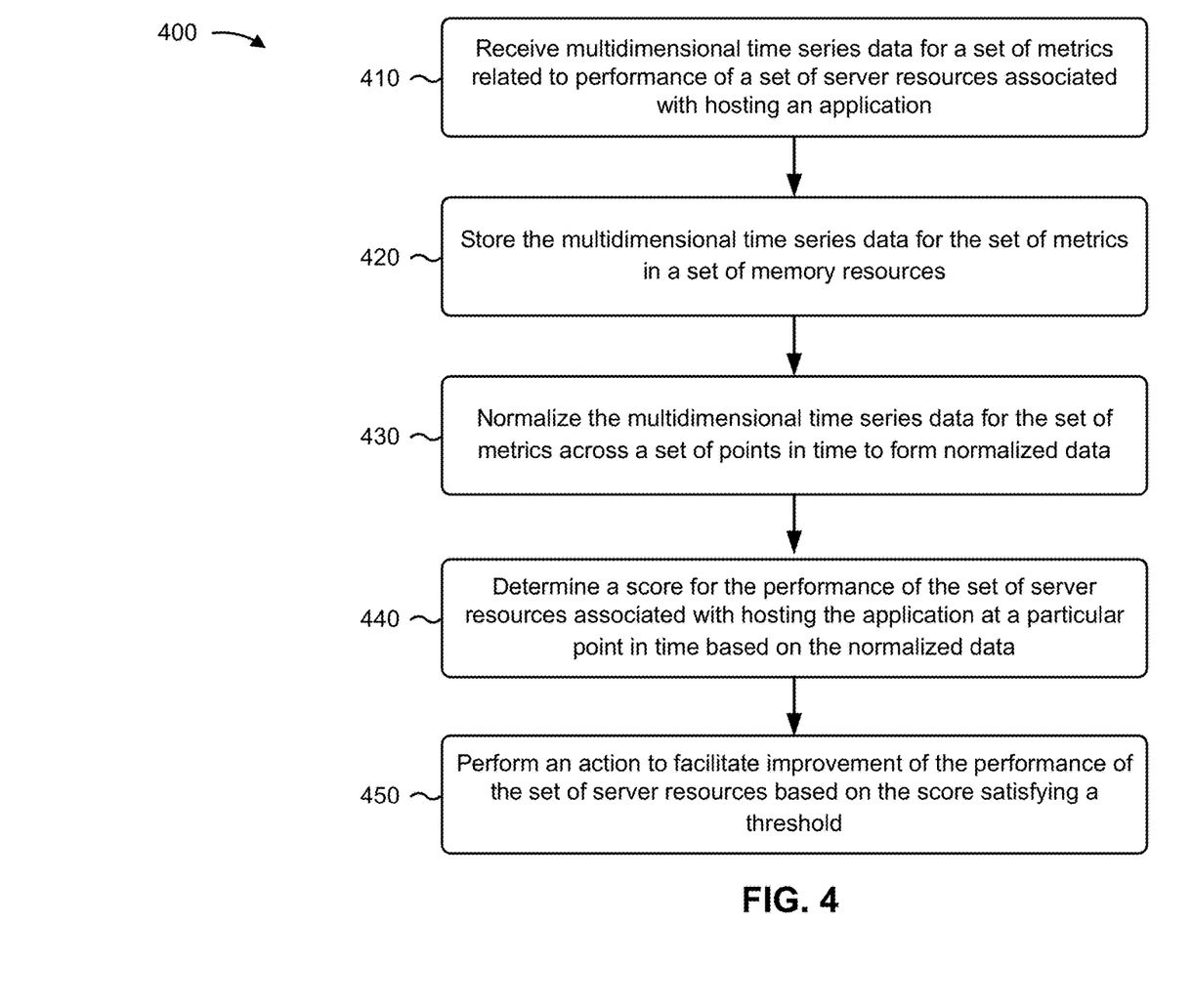
FIG. 4 is a flow chart of an example process for real-time analysis of multidimensional time series data to identify an operational anomaly.

FIG. 4 is a flow chart of an example process 400 for real-time analysis of multidimensional time series data to identify an operational anomaly. In some implementations, one or more process blocks of FIG. 4 may be performed by performance analysis platform 230. In some implementations, one or more process blocks of FIG. 4 may be performed by another device or a group of devices separate from or including performance analysis platform 230, such as data center 210, server device 220, computing resource 234, or user device 240.

As shown in FIG. 4, process 400 may include receiving multidimensional time series data for a set of metrics related to performance of a set of server resources associated with hosting an application (block 410). For example, performance analysis platform 230 may receive (e.g., using computing resource 234, processor 320, communication interface 370, and/or the like) multidimensional time series data from one or more server devices 220 for a set of metrics related to performance of a set of server resources (e.g., server device 220, a computing resource of server device 220, a container, hardware, software, etc.) associated with hosting an application. In some implementations, the application may include an application hosted by the set of server resources, an application that is executing on the set of server resources, and/or the like.

In some implementations, performance analysis platform 230 may receive the multidimensional time series data as the application performs a set of operations (e.g., in real-time or near real-time). In some implementations, performance analysis platform 230 may receive hundreds, millions, billions, or more of data elements, thereby receiving a data set that cannot be processed manually or objectively by a human actor. In addition, performance analysis platform 230 may analyze hundreds, thousands, or more applications (e.g., concurrently, in parallel, etc.).

In some implementations, the multidimensional time series data may be related to various dimensions of operational performance of the set of server resources. For example, the multidimensional time series data may include values for a set of application-related metrics, a set of runtime-related metrics, a set of container-related metrics, a set of operating system-related metrics, a set of hardware-related metrics, a set of network-related metrics, and/or the like.

In some implementations, the multidimensional time series data may be time series data received over a period of time, received for the same time period across different historical points in time (e.g., for the same time of day across different days, for the same day of the week across different weeks, etc.), and/or the like.

In some implementations, performance analysis platform 230 may receive the multidimensional time series data periodically, according to a schedule, based on requesting the multidimensional time series data, via network 250, in a streaming manner (e.g., as a stream of data (in real time) as the data is generated), and/or the like. As an example, the performance analysis platform 230 may request the multidimensional time series data from the set of server resources prior to receiving the multidimensional time series data from the set of server resources.

In some implementations, performance analysis platform 230 may receive metadata associated with multidimensional time series data (e.g., for values of a set of metrics). For example, the metadata may include a timestamp for the multidimensional time series data, an identifier that identifies the set of server resources that is hosting the application, an identifier that identifies the application, and/or the like. In some implementations, the metadata may be used to organize the multidimensional time series data and/or to select multidimensional time series data for particular server resources for analysis, as described elsewhere herein.

In this way, performance analysis platform 230 may receive multidimensional time series data prior to storing the multidimensional time series data.

As further shown in FIG. 4, process 400 may include storing the multidimensional time series data for the set of metrics in a set of memory resources (block 420). For example, performance analysis platform 230 may store (e.g., using computing resource 234, processor 320, memory 330, storage component 340, and/or the like) the multidimensional time series data for the set of metrics in a set of memory resources. In some implementations, the set of memory resources may include a data structure, such as a database and/or the like. In some implementations, the memory resources may be configured to store multidimensional time series data. This facilitates easy access to multidimensional time series data to search, find, analyze, and/or the like the multidimensional time series data, thereby conserving processing resources and/or memory resources. For example, based on the way the multidimensional time series data is stored, performance analysis platform 230 may eliminate redundant data (e.g., if the multidimensional time series data at one point in time matches multidimensional time series data at the next point in time, then performance analysis platform 230 may not store the multidimensional time series data until the multidimensional time series data does not match or does not match within a threshold).

In some implementations, performance analysis platform 230 may store the multidimensional time series data according to metadata. For example, performance analysis platform 230 may store the multidimensional time series data organized by particular server resources, by a type of metric (e.g., a dimension), in a chronological order in which the multidimensional time series data was received, and/or the like.

In some implementations, performance analysis platform 230 may identify the multidimensional time series data associated with hosting the application after receiving the data for the plurality of metrics. For example, performance analysis platform 230 may receive the multidimensional time series data for the application in association with other multidimensional time series data for one or more other applications. Continuing with the previous example, performance analysis platform 230 may receive multidimensional time series data for multiple different server resources and/or applications, and may identify multidimensional time series data for a particular server resource associated with a particular application (e.g., based on metadata associated with the multidimensional time series data).

In some implementations, performance analysis platform 230 may identify active server resources, of the set of server resources, after receiving the multidimensional time series data. For example, at the time an analysis is to be performed, performance analysis platform 230 may communicate with the set of server resources to identify which server resources are currently active (e.g., by sending a message to the set of server resources and identifying which server resources respond, based on a log that identifies active server resources, etc.). In some implementations, if performance analysis platform 230 is performing a real-time analysis, performance analysis platform 230 may not need to identify which server resources are active, as performance analysis platform 230 may determine that the set of server resources that are providing multidimensional time series data are active. This may conserve processing resources associated with identifying active server resources by reducing or eliminating a need for performance analysis platform 230 to identify active server resources.

In this way, performance analysis platform 230 may store the multidimensional time series data prior to normalizing the multidimensional time series data.

As further shown in FIG. 4, process 400 may include normalizing the multidimensional time series data for the set of metrics across a set of points in time to form normalized data (block 430). For example, performance analysis platform 230 may normalize (e.g., using computing resource 234, processor 320, memory 330, storage component 340, and/or the like) the multidimensional time series data for the set of metrics across a set of points in time to form normalized data. In some implementations, the normalized data may identify a normal distribution for the performance of the set of server resources across the set of points in time.

In some implementations, performance analysis platform 230 may normalize the multidimensional time series data using a normalization technique. For example, performance analysis platform 230 may normalize the data using a Box-Cox normalization technique to form the normalized data (e.g., to transform actual multidimensional time series data to a normal distribution). In some implementations, performance analysis platform 230 may normalize data for each of the dimensions of the multidimensional time series. For example, performance analysis platform 230 may generate a first normal distribution of values for hardware-related metrics, a second normal distribution of values for software-related metrics, a third normal distribution of values for operating system-related metrics, and/or the like.

In some implementations, the normalized data may identify a normal distribution for values of data for a time period, for the same point in time on different days of the week or on different weeks of the day, and/or the like. This facilitates analysis of operational performance of the set of server resources relative to an operational performance of the set of server resources at the same point in time on different days of the week or weeks of the month, during a time period, and/or the like. In addition, this facilitates an analysis of various dimensions of operational performance relative to each other, thereby conserving processing resources of performance analysis platform 230 via more efficient analysis (e.g., relative to not normalizing the multidimensional time series data and analyzing un-normalized multidimensional time series data). This facilitates contextual analysis of operational performance of the set of server resources.

In this way, performance analysis platform 230 may normalize the multidimensional time series data prior to determining a score for the performance of the set of server resources.

As further shown in FIG. 4, process 400 may include determining a score for the performance of the set of server resources associated with hosting the application at a particular point in time based on the normalized data (block 440). For example, performance analysis platform 230 may determine (e.g., using computing resource 234, processor 320, memory 330, storage component 340, and/or the like) a score for the performance of the set of server resources associated with hosting the application at a particular point in time based on the normalized data. In some implementations, the score may be used to determine whether an anomaly is present in the operational performance of the set of server resources at the particular point in time. In some implementations, the score may indicate a health of the operational performance of the set of server resources at the particular point in time relative to the operational performance of the set of server resources across the set of points in time.

In some implementations, performance analysis platform 230 may determine scores for different subsets of metrics included in the plurality of metrics (e.g., after normalizing the data). For example, performance analysis platform 230 may determine scores for different dimensions of operational performance of the set of server resources (e.g., a first score for hardware-related resources, a second score for software-related metrics, etc.). In some implementations, performance analysis platform 230 may determine the score based on the scores for the different subsets of metrics after determining the scores for the different subsets of metrics. For example, performance analysis platform 230 may determine an overall score for the different scores for the different dimensions.

In some implementations, performance analysis platform 230 may determine a score using a machine learning module. For example, the machine learning module may have been trained on data identifying values for metrics related to a performance of server resources of server device 220 and corresponding scores. In this way, performance analysis platform 230 may quickly and efficiently determine a score for operational performance of server resources of server device 220. In addition, this reduces or eliminates a need for performance analysis platform 230 to re-determine a score for operational performance of server resources when values for metrics related to operational performance of the server resources are similar to values for a previously determined score, thereby conserving processing resources and/or computing resources of performance analysis platform 230.

In some implementations, performance analysis platform 230 may process the normalized data using a probability density function after normalizing the data in association with determining the score. For example, performance analysis platform 230 may determine p values for the normalized data (e.g., may determine a p value for real-time multidimensional time series data based on the normal distribution for the multidimensional time series data). In some implementations, performance analysis platform 230 may use an output of the probability density function to determine the score. For example, the output may be a p value, such as for a particular point in time (e.g., a current time or time for which data is being processed). In some implementations, and continuing with the previous example, performance analysis platform 230 may determine p values for different dimensions of operational performance of the set of server resources (e.g., a first p value for operational performance of hardware, a second p value for operational performance of software, etc.).

In some implementations, performance analysis platform 230 may determine an overall score across the dimensions. For example, performance analysis platform 230 may apply a function to scores for subsets of metrics (e.g., p values for different dimensions). Continuing with the example, performance analysis platform 230 may add p values, multiply p values, average p values, etc. across the dimensions of operational performance of the set of server resources.

In some implementations, performance analysis platform 230 may process the score using a scaling technique after determining the score and may determine that the anomaly is present in the performance of the set of server resources after processing the score using the scaling technique. For example, to scale a score, performance analysis platform 230 may square an inverse of the score (e.g., $(1/score)^2$) to form a scaled score. In this way, performance analysis platform 230 may exaggerate anomalies indicated by a score. This facilitates easier identification of anomalies, thereby improving identification of anomalies. In addition, this reduces or eliminates false positive identification of anomalies, thereby conserving processing resources by reducing or eliminating situations where performance analysis platform 230 performs an action related to a false positive anomaly.

In some implementations, performance analysis platform 230 may determine that the score satisfies a threshold, is within a range of values, is trending up or down, and/or the like after processing the score using the scaling technique. For example, the threshold may indicate anomalous performance of the set of server resources across multiple dimensions and in the context of a historical performance of the set of server resources at a particular time. In some implementations, performance analysis platform 230 may determine that the score satisfies the threshold using the scaled score. In some implementations, the threshold may be predetermined, the threshold may be determined based on normalized multidimensional time series data (e.g., the threshold may be set at a particular standard deviation from an average score for normalized multidimensional time series data), and/or the like. In this way, performance analysis platform 230 may determine that an anomaly is present in the performance of the set of server resources at the particular point in time based on the score relative to the normal distribution for the performance of the set of server resources. In some implementations, performance analysis platform 230 may determine that an anomaly is not present or is no longer present in a similar manner.

In this way, performance analysis platform 230 may determine a score for the performance of the set of server resources prior to performing an action to facilitate improvement of the performance of the set of server resources.

As further shown in FIG. 4, process 400 may include performing an action to facilitate improvement of the performance of the set of server resources based on the score satisfying a threshold (block 450). For example, performance analysis platform 230 may perform (e.g., using computing resource 234, processor 320, memory 330, storage component 340, communication interface 370, and/or the like) an action to facilitate improvement of the performance of the set of server resources based on the score satisfying a threshold. In some implementations, satisfaction of the threshold may indicate that an anomaly is present, as described elsewhere herein.

In some implementations, performance analysis platform 230 may modify a deployment of the application from a first server resource, of the set of server resources, to a second server resource, of the set of server resources, based on determining that the score satisfies the threshold. For example, performance analysis platform 230 may cause an application to be deployed on a different server resource than the server resource on which the application is currently deployed. Additionally, or alternatively, performance analysis platform 230 may cause a server resource to be taken off line or to cause a server resource to be brought on line. As yet another example, performance analysis platform 230 may initiate an additional instance of an application, or may remove an instance of an application. Additionally, or alternatively, performance analysis platform 230 may load balance traffic across server resources. Additionally, or alternatively, performance analysis platform 230 may power on a subset of server resources after determining that the anomaly is present, or power off the subset of server resources after determining that the anomaly is present.

In some implementations, performance analysis platform 230 may output an alert that indicates that the score satisfies the threshold after determining that the score satisfies the threshold. In some implementations, performance analysis platform 230 may generate a report that identifies an anomaly and/or an action taken to fix the anomaly. Additionally, or alternatively, performance analysis platform 230 may send a message (e.g., an email, a short message service (SMS) message, etc.) to user device 240 that identifies an anomaly, an action taken, a current score for performance after taking the action, and/or the like. Additionally, or alternatively, performance analysis platform 230 may cause a user interface to be provided for display via user device 240 (e.g., a user interface that permits a network administrator to view values for metrics, to view scores for dimensions of operational performance, to select an action to be performed, etc.).

In some implementations, performance analysis platform 230 may process information identifying a score, multidimensional time series data, an action, and/or an outcome of performing an action to train a model (e.g., associated with a machine learning module), such as to improve future analyses and/or actions performed. In this way, performance analysis platform 230 may facilitate faster identification of future anomalies and/or facilitate faster performance of actions, which conserves processing resources that would otherwise be consumed identifying an anomaly and/or due to a delayed performance of an action.

In some implementations, performance analysis platform 230 may monitor a score for operational performance of the set of server resources. For example, performance analysis platform 230 may determine whether the score improves after performance of an action to facilitate improvement of the operational performance of the set of server resources. Performance analysis platform 230 may then take an additional action if the score does not improve.

A number of actions have been described above. In practice, performance analysis platform 230 may perform any one of these actions or any combination of these actions. In some implementations, performance analysis platform 230 may perform multiple actions concurrently. In some implementations, performance analysis platform 230 may perform multiple actions serially (i.e., a first action followed by a second action). In some aspects, performance analysis platform 230 may perform multiple actions selectively. For example, performance analysis platform 230 may perform one or more first actions and selectively perform one or more second actions based on results of performing the one or more first actions.

In this way, performance analysis platform 230 may perform an action to facilitate improvement of the performance of the set of server resources.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, performance analysis platform 230 may perform a contextual analysis of operational performance of a set of server resources using multidimensional time series data. This facilitates identification of previously unknown operational anomalies related to the set of server resources, thereby improving performance of the set of server resources. In addition, this facilitates earlier identification of anomalies relative to a non-contextual analysis of performance of the set of server resources and/or using single dimensional data. Further, this conserves processing resources that would otherwise be consumed via less accurate identification of operational anomalies, later detection of operational anomalies, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   receiving, by one or more devices and from one or more servers that host an application, multidimensional time series data as the application performs one or more operations,
      the multidimensional time series data being received in a periodic manner,
      the multidimensional time series data being received in real-time or near real-time to the application performing the one or more operations, and
      the multidimensional time series data being for one or more metrics related to performance of server resources associated with the one or more servers,
   determining, by the one or more devices, scores for different subsets of metrics included in the one or more metrics;
   determining, by the one or more devices, an overall score for the performance of the server resources associated with hosting the application at a particular point in time based on the scores for the different subsets of metrics,
      wherein the overall score is to be used to determine whether an anomaly is present in the performance of the server resources at the particular point in time;
   determining, by the one or more devices, that the multidimensional time series data does not match, or does not match within a threshold, other multidimensional time series data that was received at a previous point in time;
   storing, by the one or more devices and according to metadata associated with the multidimensional time series data, the multidimensional time series data based on determining that the multidimensional time series data does not match, or does not match within the threshold, the other multidimensional time series data,
      wherein the metadata is used to organize the multidimensional time series data by particular server resources of the server resources; and
   performing, by the one or more devices and based on the overall score satisfying a threshold, an action to facilitate improvement of the performance of the server resources after storing the multidimensional time series data.

2. The method of claim 1, where the multidimensional time series data includes values for one or more of:
   a set of application-related metrics,
   a set of runtime-related metrics,
   a set of operating system-related metrics,
   a set of hardware-related metrics, or
   a set of network-related metrics.

3. The method of claim 1, where the multidimensional time series data is received based on requesting the multidimensional time series data in a streaming manner.

4. The method of claim 1, further comprising:
   receiving the metadata.

5. The method of claim 1, where the metadata includes one or more of:
   a timestamp for the multidimensional time series data,
   an identifier that identifies a set of server resources that includes the one or more servers, or
   an identifier that identifies the application.

6. The method of claim 1, where the multidimensional time series data is stored in a set of memory resources that are configured to store the multidimensional time series data.

7. The method of claim 1, further comprising:
   determining, before receiving the multidimensional time series data, that redundant data matches the other multidimensional time series data; and
   eliminating the redundant data, without storing the redundant data, based on determining that the redundant data matches the other multidimensional time series data.

8. The method of claim 1,
   where the metadata includes information regarding the particular server resources of the server resources.

9. The method of claim 1, where the multidimensional time series data is received in association with different multidimensional time series data for one or more other applications.

10. The method of claim 1, further comprising:
    determining, based on the one or more servers providing the multidimensional time series data, that the server resources are active without separately identifying which one or more of the server resources are active.

11. A system comprising:
    one or more memories; and
    one or more processors, communicatively coupled to the one or more memories, to:
       receive, from one or more servers that host an application, multidimensional time series data as the application performs one or more operations,
          the multidimensional time series data being for one or more metrics related to performance of server resources associated with the one or more servers;
       determine scores for different subsets of metrics included in the one or more metrics;

determine an overall score for the performance of the server resources associated with hosting the application at a particular point in time based on the scores for the different subsets of metrics,
    wherein the overall score is to be used to determine whether an anomaly is present in the performance of the server resources at the particular point in time;
determine that the multidimensional time series data does not match, or does not match within a threshold, other multidimensional time series data that was received at a previous point in time; and
store, according to metadata associated with the multidimensional time series data, the multidimensional time series data based on determining that the multidimensional time series data does not match, or does not match within the threshold, the other multidimensional time series data,
    wherein the metadata is used to organize the multidimensional time series data by particular server resources of the server resources.

12. The system of claim 11, where the one or more processors are further to:
perform, based on the multidimensional time series data, an action to facilitate operational improvement of a performance of server resources, of the one or more servers, after storing the multidimensional time series data.

13. The system of claim 11, where the multidimensional time series data is received in real-time or near real-time to the application performing the one or more operations.

14. The system of claim 11, where the multidimensional time series data is for one or more metrics related to performance of server resources associated with the one or more servers.

15. The system of claim 11, where the one or more processors are further to:
determine, based on the one or more servers providing the multidimensional time series data, that server resources, of the one or more servers, are active without separately identifying which one or more of the server resources are active.

16. A non-transitory computer-readable medium storing instructions, the instructions comprising:
one or more instructions that, when executed by one or more processors, cause the one or more processors to:
    receive, from one or more servers that host an application, multidimensional time series data as the application performs one or more operations,
        the multidimensional time series data being for one or more metrics related to performance of server resources associated with the one or more servers;
    determine scores for different subsets of metrics included in the one or more metrics;
    determine an overall score for the performance of the server resources associated with hosting the application at a particular point in time based on the scores for the different subsets of metrics,
        wherein the overall score is to be used to determine whether an anomaly is present in the performance of the server resources at the particular point in time;
    determine that the multidimensional time series data does not match, or does not match within a threshold, other multidimensional time series data that was received at a previous point in time; and
    store, according to metadata associated with the multidimensional time series data, the multidimensional time series data based on determining that the multidimensional time series data does not match, or does not match within the threshold, the other multidimensional time series data,
        wherein the metadata is used to organize the multidimensional time series data by particular server resources of the server resources.

17. The non-transitory computer-readable medium of claim 16, where the one or more instructions, when executed by the one or more processors, further cause the one or more processors to:
perform, based on the multidimensional time series data, an action to facilitate improvement of a performance of server resources, of the one or more servers, after storing the multidimensional time series data.

18. The non-transitory computer-readable medium of claim 16, where the multidimensional time series data is received in real-time or near real-time to the application performing the one or more operations.

19. The non-transitory computer-readable medium of claim 16, where the multidimensional time series data is for one or more metrics related to performance of server resources associated with the one or more servers.

20. The non-transitory computer-readable medium of claim 16, where the one or more instructions, when executed by the one or more processors, further cause the one or more processors to:
determine, based on the one or more servers providing the multidimensional time series data, that server resources, of the one or more servers, are active without separately identifying which one or more of the server resources are active.

* * * * *